United States Patent
Raibel et al.

(10) Patent No.: US 12,209,552 B2
(45) Date of Patent: Jan. 28, 2025

(54) PISTON AND INTERNAL COMBUSTION ENGINE HAVING SUCH A PISTON

(71) Applicant: INNIO Jenbacher GmbH & Co OG, Jenbach (AT)

(72) Inventors: Matthias Raibel, Innsbruck (AT); Jochen Fuchs, Wattens (AT); Robert Boewing, Innsbruck (AT); Andreas Birgel, Innsbruck (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/038,705

(22) PCT Filed: Nov. 27, 2020

(86) PCT No.: PCT/AT2020/060424
§ 371 (c)(1),
(2) Date: May 25, 2023

(87) PCT Pub. No.: WO2022/109632
PCT Pub. Date: Jun. 2, 2022

(65) Prior Publication Data
US 2023/0417204 A1  Dec. 28, 2023

(51) Int. Cl.
*F02F 3/28* (2006.01)
*F02B 19/00* (2006.01)

(52) U.S. Cl.
CPC ............... *F02F 3/28* (2013.01); *F02B 19/00* (2013.01)

(58) Field of Classification Search
CPC .......................................................... F02F 3/28
See application file for complete search history.

(56) References Cited

U.S. PATENT DOCUMENTS

2005/0115537 A1* 6/2005 Liu ..................... F02B 23/0672
123/276
2020/0224583 A1* 7/2020 Anders ................... F02B 11/00

FOREIGN PATENT DOCUMENTS

| EP | 2935825 A1 | 10/2015 |
| WO | 2012125961 A1 | 9/2012 |
| WO | 2019175318 A1 | 9/2019 |

OTHER PUBLICATIONS

PCT International Search Report and Written Opinion; Application No. PCT/AT2020/060424; dated Jul. 30, 2021; 13 pages.

* cited by examiner

Primary Examiner — Kevin A Lathers
(74) Attorney, Agent, or Firm — Fletcher Yoder, P.C.

(57) ABSTRACT

Piston for an internal combustion engine, preferably a gas engine comprising a pre-chamber, comprising a piston crown limiting the piston on a side facing a cylinder head when the piston is arranged inside an internal combustion engine, wherein the piston crown comprises at least one piston bowl which has a lower surface level than a radial edge region of the piston crown, wherein the piston bowl comprises a depth (d), which is defined by the distance between the radial edge region and the lower surface level of the piston bowl measured parallel to central elevation which has a height (H), wherein the height (H) of the central elevation equals the depth (d) of the piston bowl plus/minus 50%, preferably 20%, of the depth (d) of the piston bowl.

22 Claims, 4 Drawing Sheets

PISTON AND INTERNAL COMBUSTION ENGINE HAVING SUCH A PISTON

CROSS-REFERENCE TO RELATED APPLICATION

This application is a National Stage entry from, and claims benefit of, PCT Application No. PCT/AT2020/060424, filed on Nov. 27, 2020; entitled "PISTON AND INTERNAL COMBUSTION ENGINE HAVING SUCH A PISTON", which is herein incorporated by reference in its entirety.

BACKGROUND

The present invention relates to a piston for an internal combustion engine, preferably a gas engine, comprising a pre-chamber, an internal combustion engine having such a piston and a usage of such a piston.

In Otto-cycle operated internal combustion engines, in particular in gas engines, in which a fuel-air mixture is ignited, for larger combustion chamber volumes often a lean burn concept is applied. This means that a relatively large air excess is present, so that a maximum power and simultaneously high efficiency of the engine can be reached, while harmful emissions and the thermal loading of the components are minimized. The ignition and combustion of very lean fuel-air mixtures represent a considerable challenge for the development and/or operation of modern high-performance (gas) engines.

Starting from a certain size of gas engines (generally with cylinder capacity above about 4 to 5 liters), it is necessary to use ignition amplifiers, in order to properly ignite the lean air-fuel-mixture in the large volume of the cylinders.

Pre-chambers usually serve as these ignition intensifiers, wherein the fuel-air mixture that is highly compressed at the end of the compression stroke is ignited in a relatively small secondary space separate from the main combustion chamber of the cylinders.

To get an optimal ignition result and subsequently an optimal combustion process, pre-chambers are generally provided centrically in the main combustion chamber at the cylinder head, wherein flame jets can extend symmetrically into the main combustion chamber.

In this case, a main combustion chamber may be delimited by the piston (more specifically: the piston crown), the cylinder liner forming a cylinder wall, and (a flame deck of) the cylinder head, wherein the secondary space (the pre-chamber) is connected via one or a plurality of transfer passages with the main combustion chamber.

During the ignition of the fuel-air-mixture in the main combustion chamber—the ignition being achieved by flame jets extending through the transfer passages from the pre-chamber into the main combustion chamber—the piston is essentially at or near top dead center (TDC).

The space formed between the piston crown when the piston is in the TDC, the cylinder wall formed by the cylinder liner, and the flame deck of the cylinder head is known as the "clearance volume".

It is known in the prior art, that the compression ratio (CR) is defined by $$CR = \frac{V_d + V_c}{V_c}$$

wherein $V_d$ and $V_c$ are describing the displacement volume ($V_d$) and the clearance volume ($V_c$). Therefore, assuming displacement volume ($V_d$) being constant, the compression ratio (CR) decreases with increasing clearance volume ($V_c$).

For constant $V_d$ and $V_c$, the shape of the clearance volume (and therefore the shape of the combustion chamber) influences the combustion process without changing the compression ratio. Therefore, for specific circumstances such as specific lambda values of the combustion mixture in the pre-chamber and/or the main combustion chamber, an optimization of the shape of the piston crown—leading to an optimization of the shape of the main combustion chamber—is a degree of freedom to optimize the efficiency of the combustion process and emissions.

It is known in the prior art to use pistons with a so called "roof top" design, wherein the central portion of the piston crown is the highest portion which slopes continuously in a direction of the piston skirt. The disadvantage of such a configuration is that, near the piston skirt at the cylinder wall, the main portion of the clearance volume is present which in specific circumstances is reached late by the flame jets for ignition leading to relatively high combustion duration.

This is especially the case for directly fuel-air scavenged pre-chambers ("directly" means, that the mixture is provided into the pre-chamber via a pre-chamber gas valve), since the momentum of the flame jets resulting from the ignition of lean fuel/air mixture ($\lambda > 1$) in the pre-chamber is lower compared to the ignition of a $\lambda = 1$ mixture in the pre-chamber.

In summary, the disadvantage of configurations known in the prior art is that designs of piston shapes for pre-chamber ignited combustion engines comprise unfavorable clearance volume shapes leading to unsatisfying combustion behavior.

BRIEF DESCRIPTION

An aspect of the invention, in certain embodiments, is to provide a piston for an internal combustion engine and an internal combustion engine having such a piston, for the purpose of reducing the before mentioned disadvantages.

This aspect is achieved by a piston for an internal combustion engine with the features set forth in the claims, an internal combustion engine having such a piston and a usage of such a piston.

According to certain embodiments of the invention, a piston crown is provided limiting the piston on a side facing a cylinder head when the piston is arranged inside an internal combustion engine, preferably a gas engine comprising a pre-chamber, wherein the piston crown comprises at least one piston bowl which has a lower surface level than a radial edge region of the piston crown, wherein the piston bowl comprises a depth, which is defined by the distance between the radial edge region and the lower surface level of the piston bowl measured parallel to a center line of the piston, wherein the piston crown comprises a central elevation which has a height, wherein the height of the central elevation equals the depth of the piston bowl plus/minus 50%, preferably 20%, of the depth (d) of the piston bowl (2).

In other words: seen in a side view (perpendicularly to a center line of the piston), the central elevation reaches a level above or below the radial edge region, wherein the central elevation is maximally by 50%, preferably maximally 20%, higher or lower than the radial edge region measured parallel to the center line of the piston.

With the piston according to certain embodiments of the invention, the main combustion chamber can especially be modified for the use of pre-chambers. By use of the piston bowl arranged at the piston crown between the central elevation and the radial edge region, an optimal spacing of the main combustion chamber in the top dead center is provided, wherein the flame jets extending through the transfer passages from the pre-chamber into the main combustion chamber can ignite the main combustion chamber in a particularly preferred and efficient way, wherein the compression ratio can still kept constant.

In this way, the clearance volume is optimally designed for the extension of flame jets into the main combustion chamber during an ignition process, while at the same time generating an optimal geometrical volume for the ignition of the air-fuel-mixture, such that the combustion efficiency can be increased due to a higher energy conversion rate. Therefore, by use of a piston according to certain embodiments of the invention, the combustion efficiency can be maintained or even increased.

In other words, the main advantage of such a piston crown shape is that, in the top dead center (TDC) position of the piston, the majority of the clearance volume is neither in the center nor in the vicinity of the cylinder wall, but rather in between. This leads to the fact, that the flame jets are reaching the main portion of the clearance volume faster and consequently the energy conversion rate can be enhanced.

Furthermore, by use of the piston according to certain embodiments of the invention, turbulence can be generated by the movement of the piston during the compression stroke. These turbulences support the flame propagation (combustion speed) in the main combustion chamber, wherein the combustion duration can be decreased.

The central elevation can be understood as elevation arranged preferably in a central portion of the piston crown (viewed along the center line or axis of the piston, the center line of the piston being the movement direction of the piston during operation of the internal combustion engine), i.e., the piston is moved in a reciprocation manner along this center line during the operation of the internal combustion engine.

The center line of a piston may coincide with a symmetry axis of the piston.

All features and functions described with respect to the prior art can also be used together with embodiments of the invention.

Advantageous embodiments are defined in the dependent claims.

In an embodiment, it can be provided that the height of central elevation equals the depth (d) of the piston bowl plus/minus 15%, preferably 7.5%, of the depth (d) of the piston bowl.

In other words, it can be provided that the distance of the top portion of the central elevation, measured parallel to the center line of the piston, from the radial edge region is within a range of 15%, preferably 7.5% of the depth of the piston bowl.

It can be provided that the central elevation reaches the same height as the radial edge region of the piston crown.

It can be provided that the top portion of the central elevation reaches a higher level or a lower level than the radial edge region of the piston crown measured parallel to the center line of the piston.

It can be provided that the radial edge region extends essentially at a right angle with respect to the center line of the piston.

In an embodiment, it can be provided that the radial edge region directly transitions in a right angle and/or with a rounded portion into the piston skirt. Alternatively, a chamfer can be arranged between the radial edge region and the piston skirt.

The right angle of course has to be seen as a measurement which is affected by various conditions (e.g., manufacturing deviations), wherein it can vary by plus or minus one or two degrees.

Alternatively, it can be provided that the radial edge region passes into the piston skirt in a right angle ±15° with respect to the center line of the piston.

It can be provided that the piston bowl—and preferably the whole piston crown—is formed rotationally symmetric around a center line of the piston.

Alternatively, it can also be provided that more than one piston bowl is provided, wherein the piston bowls are arranged in a region of the piston crown, wherein a flame jet of a pre-chamber would expand when the piston is mounted in an internal combustion engine. Therefore, it can be provided that the piston bowls correspond to a number of transfer passages provided at a pre-chamber.

It can be provided that several piston bowls are provided—which are preferably provided symmetrically with respect to a center line of the piston—around the central elevation.

It can be provided that a chamfer is provided between the radial edge region of the piston crown and a piston skirt. The chamfer can be provided rounded or edged.

It can be provided that the piston bowl transitions essentially tangentially into the radial edge region of the piston crown. This tangentially transition can especially be seen in a view perpendicular to a center line of the piston.

It can be provided that the piston bowl transitions essentially tangentially into the central elevation of the piston crown. This tangential transition can especially be seen in a cross-section view of the piston perpendicular to a center line of the piston.

In a cross-section view of the piston perpendicular to a center line, the piston can be provided with a roughly omega-($\omega$) like shape.

It can be provided that the tangential transitions from the piston bowl to the radial edge region and/or from the piston bowl to the central elevation are formed by a transition radius. In principle, the transition radius of the piston bowl to the radial edge region and transition radius of the piston bowl to the central elevation can differ from each other.

It can be provided that the piston bowl is formed by a curvature having at least one bowl radius. In some embodiments, it can be provided that the piston bowl is formed by one bowl radius or two bowl radii.

It can be provided that the central elevation of the piston crown comprises a spherical portion and is preferably arranged symmetrically around the center line of the piston, with the spherical portion comprising a central elevation radius, preferably being smaller than the transition radius of the tangential transitions.

It can be provided that
a ratio R3/R2 of the transition radius (R3) to the edge region and the bowl radius (R2) is between 0.5 and 1.5, preferably between 0.9 and 1.1, and
a ratio R1/R2 central elevation radius (R1) and the bowl radius (R2) is between 0.1 and 0.7, preferably between 0.3 and 0.5.

In another embodiment, especially for an embodiment where the piston bowl comprises at least two bowl radii, it can be provided, that a ratio R3/R2' of the transition radius (R3) to the edge region and the second bowl radius (R2') is between 0.3 and 0.9 preferably between 0.5 and 0.7, and a ratio R2'/R2 of the second bowl radius (R2') and the bowl radius (R2) is between 0.3 and 0.8, preferably between 0.4 and 0.6.

It can be provided that a ratio of a diameter of the piston and a depth of the piston bowl is between 14 and 18, preferred is 15±1.

In other embodiments, it can be provided that a ratio of a diameter of the piston and a depth of the piston bowl is 17±1.

Dimension specifications in this document of course are subject to manufacturing deviations, the size of which are determined by the manufacturing processes used.

It can be provided that a piston skirt comprises at least two—preferably three—grooves, wherein each groove is adapted to receive a piston ring.

It can be provided that the piston comprises an upper piston component part and a lower piston component part, wherein the piston crown is arranged at the upper piston component part and a connecting device for connecting the piston with a connecting rod is arranged at the lower piston component part.

The upper piston component part and the lower piston component part can be provided by two separate parts, which could be joined together releasably.

It can be provided that the upper piston part and the lower piston part are joined together via a welding process, preferably via a friction welding process.

It can be provided that at least one cooling cavity is provided in the upper piston component part and/or in the lower piston component part and/or between the upper piston component part and the lower piston component part.

It can be provided that the at least one cooling cavity is formed in a manner, such that the thickness of a wall forming the piston crown is between 3 mm and 20 mm, preferably between 4 mm and 10 mm, in at least 50%, preferably at least 75%, of the area of a projected piston crown surface. The projected piston crown surface has to be understood as projecting surface of the piston onto a plane perpendicular to the center line of the piston.

It can be provided that a bolt—preferably a threaded bolt—is provided at a center line of the piston on a side of the upper piston part facing away from the piston crown for connecting the upper piston part with the lower piston part.

Furthermore, protection is sought for an internal combustion engine having at least one piston according to certain embodiments of the invention and preferably comprising at least one pre-chamber.

It can be provided that the internal combustion engine comprises at least one—preferably fuel or gas-mixture-scavenged—pre-chamber for each or some of the main combustion chambers of the internal combustion engine.

With a piston according to certain embodiments of the invention, the main content of the air-fuel mixture in the main combustion chamber can be ignited by the flame jets projecting from the pre-chamber into the main combustion chamber.

In general, a pre-chamber combustion process can be applied, where only fuel is supplied to the pre-chamber to be mixed with air or a lean air-fuel mixture from the main combustion chamber during the compression stroke ending up at an approximate stochiometric lambda value in the pre-chamber (generally between 0.8 and 1.2).

The piston, according to certain embodiments of the invention, is therefore even more beneficial regarding the combustion process when the pre-chamber is scavenged with a fuel-air mixture, i.e., when the fuel-air mixture is supplied to the pre-chamber via a dedicated pre-chamber supply line directly.

This pre-chamber fuel supply concept can be applied for lean burn internal combustion engines, especially lean burn gas engines, which are provided with a fuel-air mixture comprising a lambda value between approximately 1.2 and 2.2 (at full load with 1.6 to 2.2). Therefore, also the pre-chamber is scavenged with a fuel-air mixture with the same lambda value when the fuel-air mixture is supplied to the pre-chamber via a dedicated pre-chamber supply line (e.g., which is branched-off the intake manifold or the intake port) directly.

In the latter concept, the laminar flame velocity and therefore the range of the flame jets is decreased due to the high lambda value of the fuel-air mixture in the pre-chamber (less energy of the flame jets) compared to the concept where only fuel is supplied directly into the pre-chamber.

Therefore, with the piston according to certain embodiments of the invention, the combustion process in the main combustion chamber can be improved due to the specific shape of the piston crown when the above described pre-chamber fuel supply strategies, especially the latter pre-chamber fuel supply strategy, is applied.

The piston, according to certain embodiments of the invention, is therefore ideal to be used for an internal combustion engine, preferably a gas engine comprising a pre-chamber, wherein an ignitable mixture is supplied to a main combustion chamber of the internal combustion engine comprising the piston and is ignited by a pre-chamber ignition process, wherein fuel or a fuel-air mixture is supplied to the pre-chamber directly via a pre-chamber fuel- or fuel-air mixture supply line, wherein the fuel-air mixture is ignited by an ignition means before the piston reaches the top dead center (TDC) during a compression stroke.

Embodiments of the invention can preferably be used in stationary gas engines or gas engines for naval applications. Embodiments of the invention can in this case be realized on one, more and/or all of the cylinders of the reciprocating piston engine, the cylinders being the main combustion chambers in a reciprocating piston engine.

Embodiments of the invention can be used in internal combustion engines, in particular gas engines comprising a pre-chamber, which drive a generator for creating electrical energy and/or which drive a compressor/pump arrangement.

It can be provided that a compression ratio of the internal combustion engine is between 10.5 and 14.5, preferably between 12.4 and 13.6.

BRIEF DESCRIPTION OF THE DRAWINGS

Further details and advantages of the invention are apparent from the accompanying figures and the following description of the drawings. The figures show:

FIG. 6a shows a simulation result of a pre-chamber combustion process with a piston according to the prior art for an advanced crank angle compared to FIG. 5a.

DETAILED DESCRIPTION

Figure 1A:
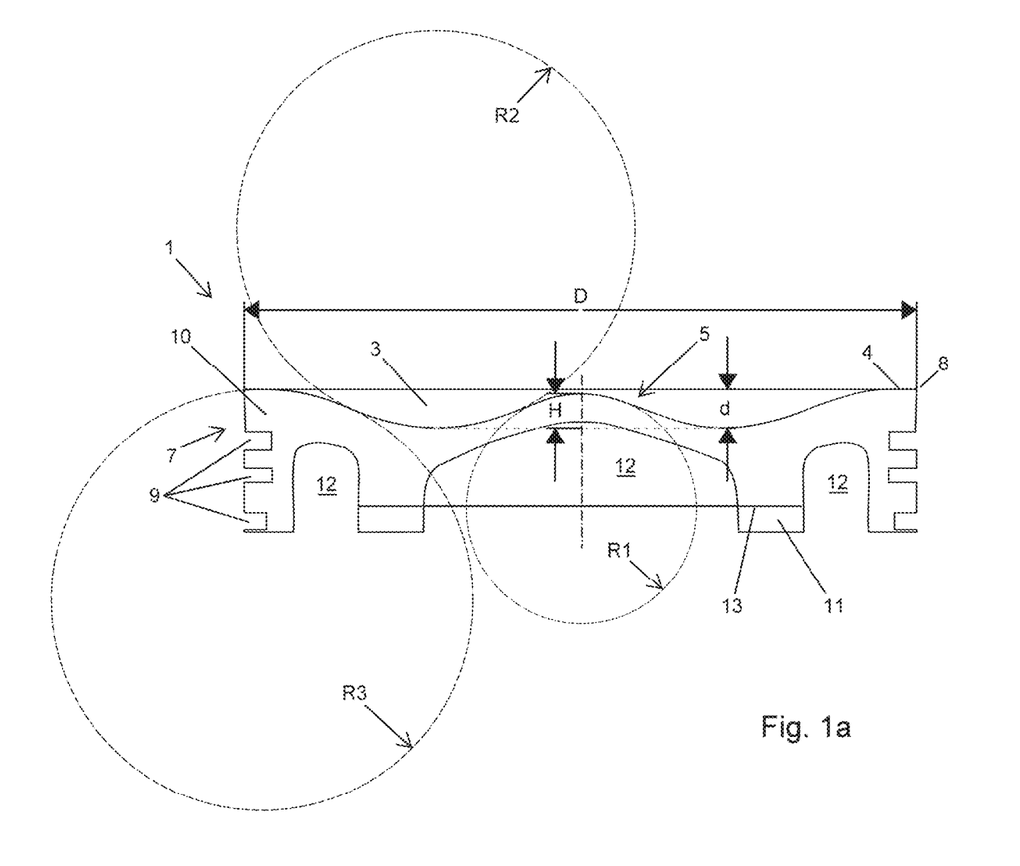
FIG. 1a shows the cross-sectional view of a first embodiment of a piston according to the invention with a single bowl radius with a central elevation being lower than the edge region. The radii of the piston crown curvature are indicated by dotted circles.

FIG. 1a shows an embodiment of a piston 1 comprising an upper piston part 10 and a lower piston part 11. The upper piston part 10 is connected with the indicatively shown lower piston part 11. The lower piston part 11 can be designed as known in the prior art.

For cooling the piston 1 during a combustion cycle of an internal combustion engine, a cooling cavity 12 is provided between the upper piston part 10 and the lower piston part 11. It can be provided that this cooling cavity 12 is flown through by a cooling medium (e.g., oil) during a combustion cycle of an internal combustion engine.

The lower piston part 11 can be connected by a connecting device (e.g., a further bolt arranged in a bore of the lower piston part 11) with a connecting rod.

The upper piston part 10 comprises a piston crown 2 limiting the piston 1 on a side facing a cylinder head 14 when the piston 1 is arranged inside an internal combustion engine. The piston crown 2 comprises a piston bowl 3, which has a lower surface level than a radial edge region 4 of the piston crown 2.

The whole upper piston part 10 shown in FIG. 1 is provided symmetrically with respect to a center line 6 of the piston 1, wherein the piston bowl 3 and the whole piston crown 2 is symmetrical around the central elevation 5.

Furthermore, the piston crown 2 comprises a central elevation 5, which reaches a higher level than the radial edge region 4 of the piston crown 2. The central elevation 5 is arranged in a central region of the piston crown 2, wherein the center line 6 of the piston 1 crosses the piston crown 2.

The central elevation 5 and the radial edge region 4 of the piston crown 2 are separated by a piston bowl 3, which piston bowl 3 is arranged between the central elevation and the radial edge region 4.

In the shown embodiment, the radial edge region 4 is arranged at a right angle with regard to the piston skirt 7 (seen in a view along an axis perpendicular to a center line 6 of the piston 1). The radial edge region 4 is formed flat and extends from the piston skirt 7 in a radial direction toward the center line 6.

The radial edge region 4 passes tangentially into the piston bowl 3. It is provided that a ratio of a diameter D of the piston 1 and a depth d of the piston bowl 3 is approximately between 14 and 16. The bed of the piston bowl 3 is shaped in a curved manner, preferably with a certain radius as indicated with a dotted circle. In this embodiment, the piston bowl 3 is formed by a single radius.

In a direction of the center line 6 of the piston 1, the piston bowl 3 passes tangentially into the central elevation 5, which is also shaped in a curved manner in this embodiment (preferably also as a circle section of a certain radius R1—central elevation radius R1). The central elevation 5 reaches its highest point at an intersection point with the center line 6.

In this embodiment, it is provided that the piston bowl 3 is provided having a bowl radius R2, wherein the bowl radius R2 forms also the transition radius R2 of the tangential transition from the piston bowl 3 to the radial edge region 4 and the tangential transition from the piston bowl 3 to the central elevation 5.

Figure 1B:
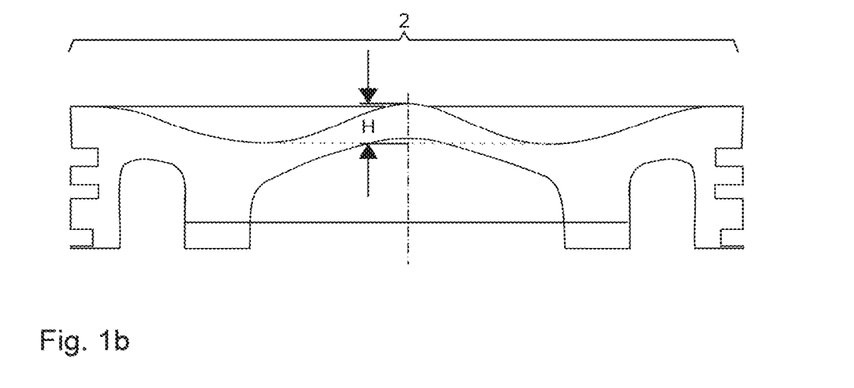
FIG. 1b shows the cross-sectional view of a second embodiment of a piston according to the invention with a single bowl radius with a central elevation being higher than the edge region.

The central elevation 5 in this embodiment (more precise the top portion of the central elevation) is—differently compared to the embodiment shown in FIG. 1b—at a lower level than the radial edge region 4 of the piston 1. "Lower level" here refers to the distance along the center line 6 in a cross-sectional view, such as in FIGS. 1a, b, where the center line 6 is arranged vertically in the drawing and the piston crown 2 faces upwards in the drawing.

The variation of the height of the central elevation 5 influences a shape of the clearance volume and the compression ratio.

The piston bowl 3 comprises a depth d, which is defined by the distance between the radial edge region 4 and the lower surface level of the piston bowl 3 (more precisely the lowest level of the piston bowl) measured parallel to a center line 6 of the piston 1.

According to certain embodiments of the invention, the distance H is in a range between the depth d±50% (of the depth d), preferably in range between the depth d±20% (of the depth d).

The shape of the piston crown 2 can also be seen as omega-(ω) like.

FIG. 1b shows an embodiment according to the embodiment as shown of FIG. 1a with the difference that the central elevation 5 has a higher level than the radial edge region 4 of the piston 1. This again influences the shape of the clearance volume in this case leading to that the amount of the clearance volume in the area of the center line 6 is even smaller. This is also shown in more detail in FIG. 3.

Figure 2A:
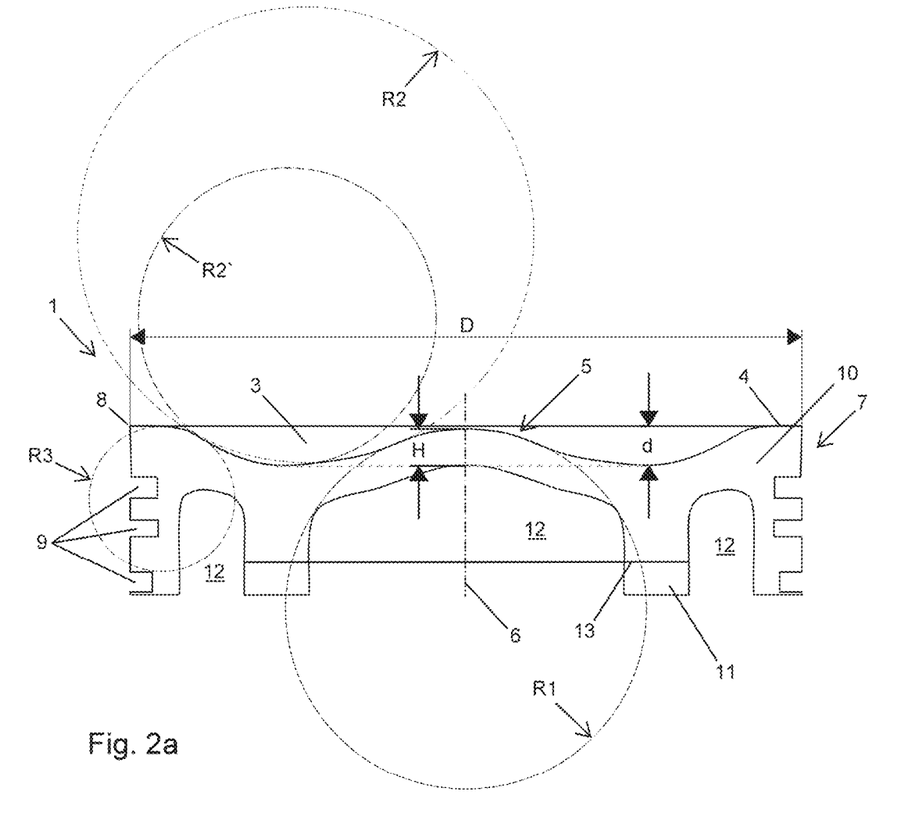
FIG. 2a shows the cross-sectional view of a third embodiment of a piston according to the invention with two piston bowl radii with a central elevation being lower than the edge region. The radii of the piston crown curvature are indicated by dotted circles.
Figure 2B:
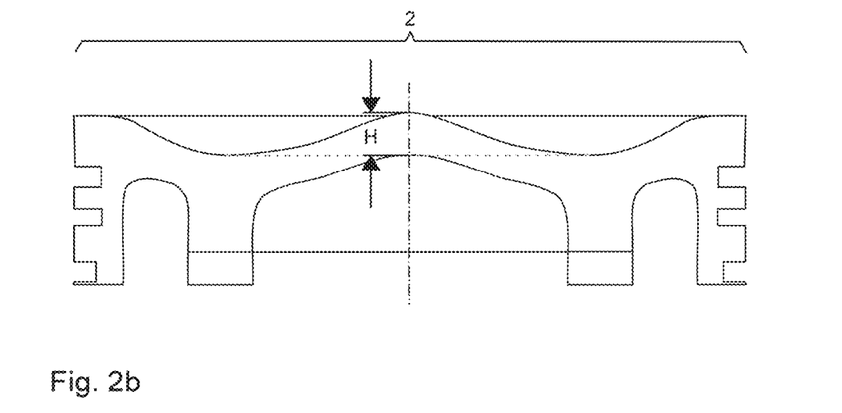
FIG. 2b shows the cross-sectional view of a fourth embodiment of a piston according to the invention with two piston bowl radii with a central elevation being higher than the edge region.

Both embodiments of FIG. 1 and FIG. 2 indicating that the central elevation radius R1, the bowl radius R2 and the transition radius R3 to the edge region 4 are each transitioning tangentially. Of course, it can be provided—but not necessarily—that between said radii linear sections can be arranged.

In this specific embodiment, it can be provided that the ratio R3/R2 is between 0.5 and 1.5, preferably between 0.9 and 1.1.

It can be provided that the ratio R1/R2 is between 0.1 and 0.7, preferably between 0.3 and 0.5.

FIG. 2a shows an embodiment with the features of the embodiment shown in FIG. 1a with the difference that the shape of the bowl 3 consists of two radii R2 and R2' as indicated with dotted circles. It can be provided that the ratio R2'/R2 is between 0.3 and 0.9 preferably between 0.5 and 0.7.

Further, for an embodiment shown in FIG. 2a, it can be provided that the ratio R3/R2' is between 0.3 and 0.9 preferably between 0.5 and 0.7.

FIG. 2b shows an embodiment according to the embodiment as shown in FIG. 2a with the difference that the central elevation 5 has a higher level than the radial edge region 4 of the piston 1. This again influences the shape of the clearance volume in this case leading to that the amount of the clearance volume in the area of the center line 6 is even smaller. This is also shown in more detail in FIG. 3.

Both embodiments of FIG. 2 indicating that the central elevation radius R1, the bowl radii R2 and R2' and the transition radius R3 to the edge region 4 are each transitioning tangentially. It can be provided—but not necessarily—that between said radii linear sections can be arranged.

For all embodiments, it can be provided that at least the piston crown 2 shape is manufactured by, e.g., a CNC turning or milling process. Also, an additive manufacturing process could be applied, wherein the whole upper part 10 of the piston crown can be manufactured.

Figure 3:
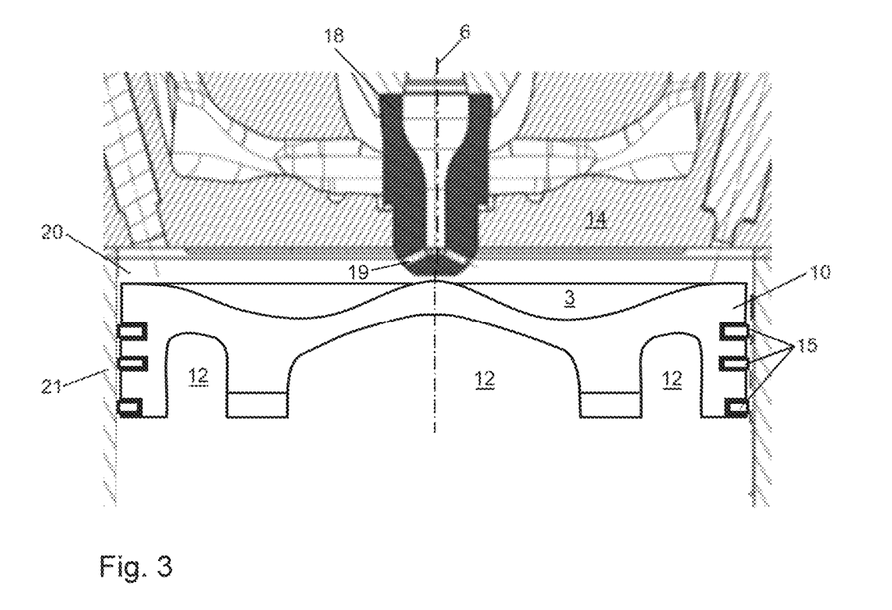
FIG. 3 shows the cross-sectional view of the embodiment of FIG. 1b arranged inside an internal combustion engine comprising a pre-chamber.

FIG. 3 shows the embodiment of FIG. 1b arranged inside an internal combustion engine, wherein the piston 1 is essentially in a top dead center position.

Of course, all embodiments of the piston 1 according to the invention can be arranged inside an internal combustion engine, more specifically in a cylinder of said internal combustion engine.

The main combustion chamber 20 (in this case the clearance volume, since the piston is in TDC) is limited by the inner wall of the cylinder liner 21, the flame plate of the cylinder head 14 and the piston crown 2 of the piston 1.

The piston skirt 7 comprises three grooves 9, wherein each groove 9 is adapted for receiving a piston ring 15. Preferably, all three piston ring grooves 9 are arranged in the upper part 10 of the piston crown. The piston rings 15 are not shown.

Along the center line 6, a pre-chamber 18 is provided in the cylinder head 14, wherein the pre-chamber 18 comprises several transfer passages 19 connecting the main combustion chamber 20 with the pre-chamber 18.

During the ignition, a fuel-air-mixture in the pre-chamber 18 is ignited by an ignition means or igniter (e.g., a spark plug). The ignited fuel-air-mixture of the pre-chamber 18 extends in form of flame jets through the transfer passages 19 from the pre-chamber 18 into the main combustion chamber 20, wherein a fuel-air-mixture present in the main combustion chamber 20 is ignited by the flame jets.

As it can be seen in the view of FIG. 3, the piston bowl 3 is arranged in such a way that it builds a greater volume of the main combustion chamber 20 (or in the clearance volume respectively) in a region where the flame jets will extend through coming from the transfer passages 19. In such a way, the efficiency of the combustion can effectively be improved, because the flame jets extending through the transfer passages 19 can ignite a larger volume of fuel-air-mixture in the main combustion chamber 20 more rapidly.

In comparison, the radial edge region 4 and central elevation 5 of the piston 1 are reducing the main combustion chamber 20 in regions not directly ignited by the pre-chamber 18. By this reduction of the main combustion chamber 20 (reduction of the clearance volume), the emissions can be reduced.

Figure 4:
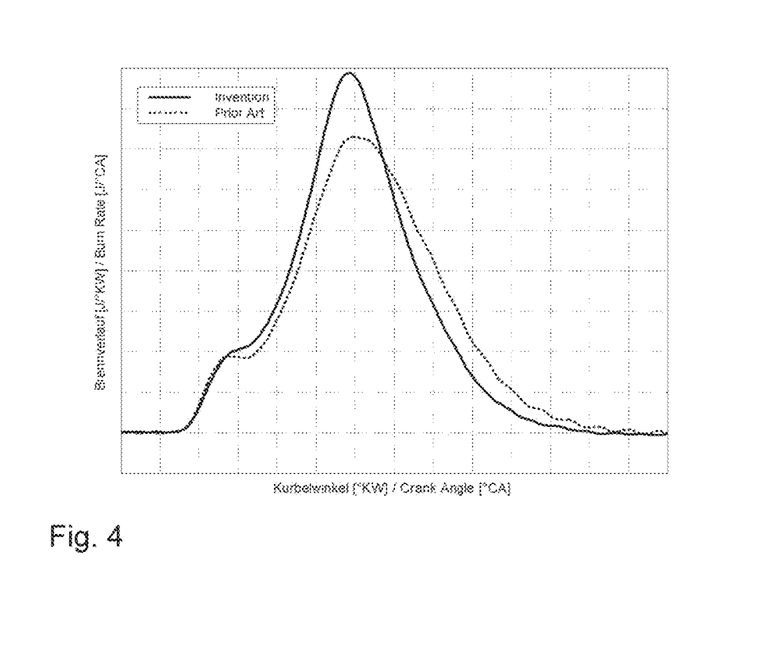
FIG. 4 shows the burn rate in a main combustion chamber for a piston according to the invention compared to a piston according to a roof top piston.

FIG. 4 shows the burning rate in terms of the measured in-cylinder pressure in a main combustion chamber for a piston according to the prior art (dotted curve) and for a piston 1 according to certain embodiments of the invention (solid curve). It can be seen, that for the piston 1 according to certain embodiments of the invention, the combustion duration is decreased due to the increased energy conversion rate due to the specific shape of the piston crown 2. This in fact, leads to higher efficiency.

Figure 5A:
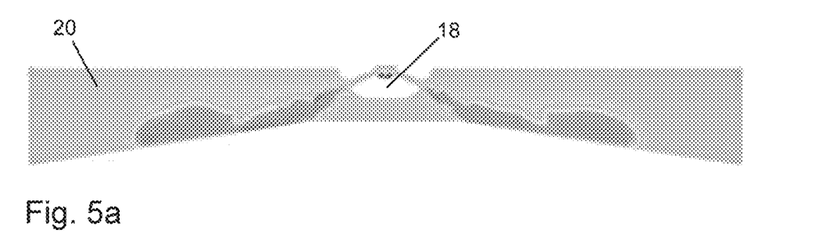
FIG. 5a shows a simulation result of a pre-chamber combustion process with a piston according to the prior art.
Figure 5B:
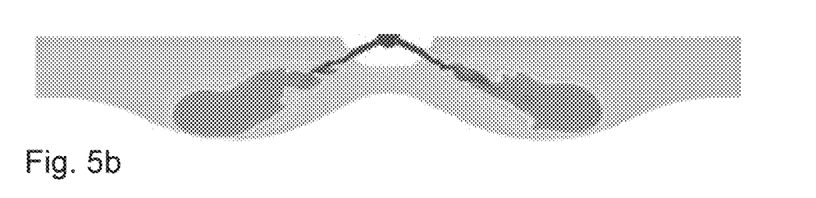
FIG. 5b shows a simulation result of a pre-chamber combustion process with a piston according to certain embodiments of the invention.

The simulation result shown in FIGS. 5a and b serves as qualitative explanation of the measurement result shown in FIG. 4.

FIG. 5a shows the simulation of a pre-chamber combustion process, wherein the main combustion chamber 20 (or the clearance volume respectively) is formed by the flame deck, the cylinder wall and a "roof top" piston crown according to the prior art. This snapshot at a specific crank angle shows how the flame jets protrude out of the pre-chamber 18 into the main combustion chamber 20. It can be seen that the flame jets impinge onto the piston crown 2, leading to thermal losses through the piston 1 and retarded flame propagation, which in turn leads to a decreased combustion efficiency (higher wall heat losses, combustion duration and emissions) in the main combustion chamber 20.

Further, it can be seen that the flame jets are igniting a volume of the main combustion chamber 20, which is smaller compared to the region in the vicinity of the cylinder wall, leading to unsatisfying energy conversion rate.

FIG. 5b shows the simulation result for a configuration with a piston 1 according to certain embodiments of the invention, comprising the same compression ratio, the same crank angle the same ignition timing as in the situation shown in FIG. 5a. It can be seen that the flame jets are not impinging the piston crown 2 as in the before described case, leading to lower thermal losses through the piston 1 and full usage of the pre-chamber impulse resulting in higher possible combustion efficiencies (lower wall heat losses, combustion duration and emissions).

Further, the flame jets are igniting a volume of the main combustion chamber 20, which is larger compared to the region in the vicinity of the cylinder wall, leading to increased energy conversion rate.

In both simulations, the lambda value in the pre-chamber 18 was assumed to be approximately 1. Therefore, the benefit of the use of a piston 1 according to certain embodiments of the invention for a pre-chamber combustion process with higher lambda of, e.g., >1.6 (where the mixture is provided directly to the pre-chamber 18) is even higher, since due to the reduced laminar flame velocity of the flame jets the majority of the main combustion chamber volume can be ignited in less time (higher energy conversion rate in the main combustion chamber 20.

Figure 6A:
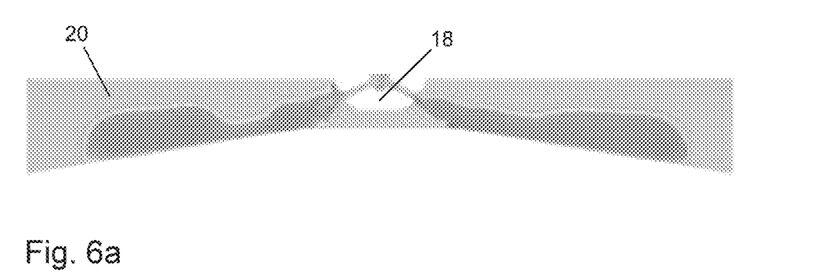
Figure 6B:
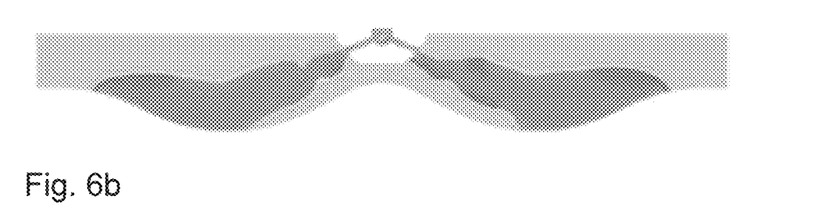
FIG. 6b shows a simulation result of a pre-chamber combustion process with a piston according to certain embodiments of the invention for an advanced crank angle compared to FIG. 5b.

FIGS. 6a and b shows the simulation result for a later time (advanced crank angle).

In contrast to the piston shape according to prior art (FIG. 6a), the flame jets can freely expand towards the outer radius of the piston bowl 3, which increases the energy conversion rate and reduces the combustion duration. In addition, the liner area which is exposed to the hot combustion gases around piston top dead center is lower in case of the piston shape according to embodiments of the invention. In total, the main combustion chamber walls surface area (flame deck, piston crown and liner) is reduced, which reduces the heat losses leading to increased efficiency.

REFERENCE SIGNS 1 piston
2. piston crown
3. Piston bowl
4. radial edge region 5. center elevation
6. center line
7. piston skirt
8. chamfer
9 groove
10. upper piston part
11. lower piston part
12. cooling cavity
13. weld seam
14. cylinder head
15. piston ring
16. connecting device
18. pre-chamber
19. transfer passages
20. main combustion chamber
21. cylinder liner
d depth the piston bowl
D diameter of the piston
H height
R1 central elevation radius
R2 bowl radius/transition radius
R2' second bowl radius/transition radius
R3 transition radius to the edge region

The invention claimed is:

1. A system, comprising:
    a piston for an internal combustion engine, wherein the piston comprises:
    a piston crown limiting the piston on a side facing a cylinder head when the piston is arranged inside the internal combustion engine, wherein the piston crown comprises at least one piston bowl having a lower surface level than a radial edge region of the piston crown, wherein the piston bowl comprises a depth, wherein the depth is defined by a distance between the radial edge region and the lower surface level of the piston bowl measured parallel to a center line of the piston, wherein the piston crown comprises a central elevation having a height, wherein the height of the central elevation is in a range of the depth of the piston bowl between plus/minus 20% of the depth of the piston bowl, wherein the piston crown transitions between the radial edge region and the central elevation with curvatures having radii at least greater than the depth of the piston bowl.

2. The system as set forth in claim 1, wherein the top portion of the central elevation reaches a lower level than the radial edge region of the piston crown measured parallel to the center line of the piston.

3. The system as set forth in claim 1, wherein the piston crown extends radially inward from an outer diameter of the piston crown having the radial edge region, the piston crown has a first tangential transition from the outer diameter to the piston bowl, and the piston crown has a second tangential transition from the piston bowl to the central elevation.

4. The system as set forth in claim 1, wherein the top portion of the central elevation reaches a higher level than the radial edge region of the piston crown measured parallel to the center line of the piston.

5. The system as set forth in claim 1, wherein the central elevation reaches the same height as the radial edge region of the piston crown.

6. The system as set forth in claim 1, wherein the radial edge region extends essentially at a right angle with respect to the center line of the piston.

7. The system as set forth in claim 1, wherein the piston bowl is rotationally symmetric around a center line of the piston.

8. The system as set forth in claim 1, wherein the piston bowl transitions essentially tangentially into the radial edge region of the piston crown.

9. The system as set forth in claim 1, wherein the piston bowl transitions essentially tangentially into the central elevation of the piston crown.

10. The system as set forth in claim 1, wherein a first tangential transition from the piston bowl to the radial edge region and/or a second tangential transition from the piston bowl to the central elevation are formed by at least one transition radius.

11. The system as set forth in claim 1, wherein the piston bowl is formed by a curvature having at least one bowl radius.

12. The system as set forth in claim 1, wherein the central elevation of the piston crown comprises a spherical portion and is arranged symmetrically around the center line of the piston, with the spherical portion comprising a central elevation radius.

13. The system as set forth in claim 1, wherein
    a first ratio of a transition radius from the piston bowl to the radial edge region and a bowl radius is between 0.5 and 1.5; and
    a second ratio of a central elevation radius and the bowl radius is between 0.1 and 0.7.

14. The system as set forth in claim 1, wherein the piston bowl comprises
    a first bowl radius and a second bowl radius, wherein
        a first ratio of a transition radius from the piston bowl to the radial edge region and the second bowl radius is between 0.5 and 0.7; and
        a second ratio of the second bowl radius and the first bowl radius is between 0.3 and 0.8.

15. The system as set forth in claim 1, wherein a ratio of a diameter of the piston and the depth of the piston bowl is between 14 and 18.

16. The system as set forth in claim 1, wherein the piston comprises an upper piston component part and a lower piston component part, wherein the piston crown is arranged at the upper piston component part and a connecting device for connecting the piston with a connecting rod is arranged at the lower piston component part.

17. The system as set forth in claim 1, comprising the internal combustion engine having at least one pre-chamber and at least one of the piston.

18. The system as set forth in claim 17, wherein the internal combustion engine has a compression ratio between 10.5 and 14.5.

19. A method, comprising:
    forming a piston crown of a piston for an internal combustion engine, wherein the piston crown comprises at least one piston bowl having a lower surface level than a radial edge region of the piston crown, wherein the piston bowl comprises a depth, wherein the depth is defined by a distance between the radial edge region and the lower surface level of the piston bowl measured parallel to a center line of the piston, wherein the piston crown comprises a central elevation having a height, wherein the height of the central elevation is in a range of the depth of the piston bowl between plus/minus 20% of the depth of the piston bowl, wherein the piston crown transitions between the radial edge region and the central elevation with curvatures having radii at least greater than the depth of the piston bowl.

20. A system comprising:
    a piston crown of a piston, wherein the piston crown comprises a piston bowl having a lower surface level than a radial edge region of the piston crown, wherein the piston bowl comprises a depth defined by a distance between the radial edge region and the lower surface level of the piston bowl measured parallel to a center line of the piston, wherein the piston crown comprises a central elevation having a height, wherein the height of the central elevation is in a range of the depth of the piston bowl between plus/minus 20% of the depth of the piston bowl, wherein the piston crown transitions between the radial edge region and the central elevation with curvatures having radii at least greater than the depth of the piston bowl.

21. The system of claim 20, comprising the piston having the piston crown, wherein the piston is configured to reciprocate in a cylinder head of a reciprocating machine.

22. The system of claim 20, wherein the piston bowl comprises a first curvature having one or more radii between the radial edge region and the central elevation, the central elevation comprises a second curvature, and the first and second curvatures are symmetric about the center line of the piston.

\* \* \* \* \*